UNITED STATES PATENT OFFICE.

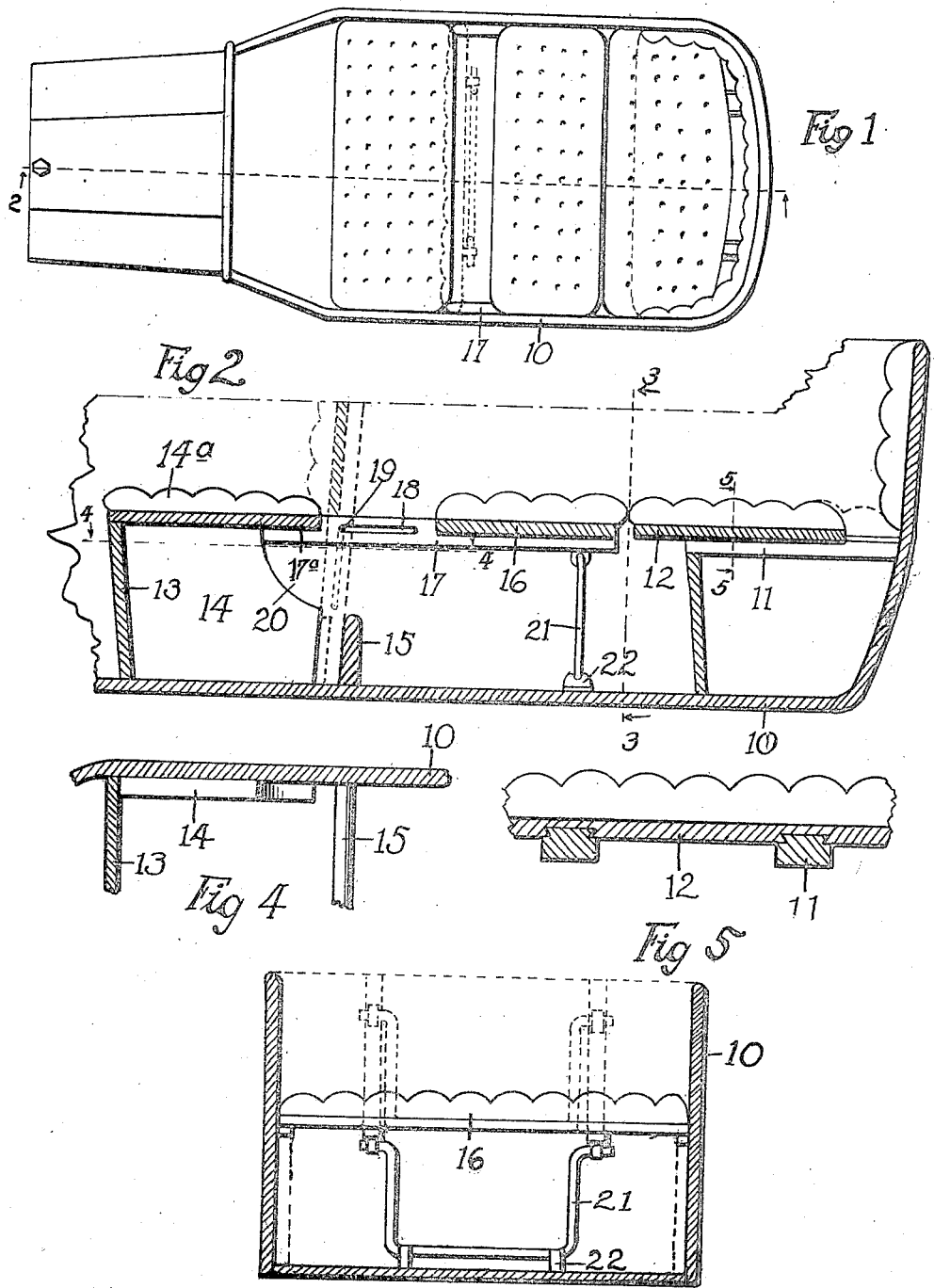

JOHN W. MYERS, OF DES MOINES, IOWA.

RECLINING-SEAT.

1,301,438.

Specification of Letters Patent.

Patented Apr. 22, 1919.

Application filed September 9, 1918. Serial No. 253,316.

*To all whom it may concern:*

Be it known that I, JOHN W. MYERS, a citizen of the United States, and a resident of Des Moines, in the county of Polk and State of Iowa, have invented a certain new and useful Reclining-Seat, of which the following is a specification.

The object of my invention is to provide a reclining seat of simple, durable and inexpensive construction particularly adapted for installation in an automobile body.

A further object is to provide a seat having a movable back and to provide means for suitably mounting said back, so that it may be lifted and then tilted rearwardly and held in reclining position.

A further object is to provide means for holding the tiltable portion of the seat in its upright position against any removal from such position.

With these and other objects in view my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a top or plan view of an automobile body equipped with a reclining seat embodying my invention.

Fig. 2 shows a longitudinal, vertical, sectional view through said body.

Fig. 3 shows a vertical, transverse, sectional view taken on the line 3—3 of Fig. 2.

Fig. 4 shows a horizontal, sectional view taken on the line 4—4 of Fig. 2; and

Fig. 5 shows a vertical, sectional view taken on the line 5—5 of Fig. 2.

In the accompanying drawings I have used the reference numeral 10 to indicate generally the body of an automobile having the ordinary bottom, back and sides.

The automobile body 10 has the rear seat frame 11 provided with the sliding seat 12. The seat 12 is mounted to slide, as illustrated in Fig. 5, so that it may be moved from its rearward ordinary position forwardly to position illustrated in Fig. 2 where the device is used for an ambulance or sleeping or the like.

A front seat is provided in the automobile body comprising the front upright supporting member 13 and the spaced side members 14, above which is the seat 14ª. Spaced rearwardly from the rear edges of the seat and extending from the floor of the automobile upwardly and terminating below the level of the seat 14ª is a support or holding member 15. There is provided for the front seat a back 16 having secured to its sides spaced opposite frame members 17, in which are formed longitudinally elongated openings 18.

Mounted in the frame 10 and extending transversely across the body of the machine just rearwardly of the seat 14ª is a rod 19 which extends through the openings 18. In its normal position the seat back 16 is upright, as illustrated by dotted lines in Fig. 2, with the lower ends of the frame members 17 received in the slots between the side walls 14 and the supporting member 15, as clearly shown by said dotted lines.

At the upper rear corner of each side member 14 a notch 20 is cut out on a curved line, as illustrated in Fig. 2, so that the seat 16 may be raised and swung rearwardly to the position shown in full lines in Fig. 2.

Each frame member 17 is formed with a notch 17ª in its lower portion, so arranged as to receive the under surface of the rear part of the seat 14 when the back member 16 is in its reclining or horizontal position, as shown in Fig. 2.

The notch 17ª is so located that when the back member 16 is in upright position, the notch terminates in its upper end below the point where the notch 20 begins, as illustrated by dotted lines in Fig. 2, so that the seat member 16 will be held firmly in position against any forward and backward swinging or rocking movement when the seat back member is in its upright position.

When the seat back member 16 is swung to its horizontal position, it is held against forward movement by the engagement of the notch 17ª with the seat member 14ª. It is held against rearward movement by the engagement of the rod 19 at the forward end of the slots 18.

Pivotally supported on the back of the seat back member 16 is a yoke 21, shown clearly in Figs. 2 and 3, which, when the seat back member 16 is in its horizontal position, hangs downwardly as illustrated in Figs. 2 and 3, and is supported in sockets 22, whereby the rear end of the seat back member 16 is supported. The engagement of the forward part of the frame members 17 with the seat member 14ᵃ together with the rod 19 also helps to hold the seat back 16 in horizontal position.

If desired a board may be laid across on the members 17 between the members 16 and 14ᵃ and a blanket or the like laid thereon to form a cushion between the seat members 14ᵃ and 16.

The practical operation of my improved reclining seat will be understood from the foregoing description.

The advantages of such a device are largely obvious. With such a device the automobile may be used for sleeping in taking long trips or may be used for an ambulance when desired.

The parts which permit the tilting of the seat back are of simple and inexpensive construction and are so arranged as to firmly hold the seat back member in its adjusted positions without the use of complicated fastening devices.

Some changes may be made in the construction and arrangement of the parts of my device without departing from the real intent and purpose of my invention, and it is my intention to cover by this application any modified forms of structure or use of mechanical equivalents which may be reasonably included within the scope of my claim.

I claim as my invention:

In a device of the class described, an automobile body having side members and a bottom member, said side members being provided with parallel opposite guide-ways near their lower portions, a front seat member, a seat back member having side frame members provided with parallel longitudinally elongated slots, a transverse rod mounted in the sides of said body and received in said slot, the parts being so arranged that when the seat back member is in its normal position, the side frame members thereof have their lower ends received in said guide ways and said rod is in the upper portion of the slots and adapted partially to support the weight of the seat back member, and being so arranged that when the seat back member is raised, its side members may be swung to clear said guide.

Des Moines, Iowa, July 17, 1918.

JOHN W. MYERS.